March 16, 1965     W. HESENER     3,173,548
RETRACTABLE CLOTHESLINES DEVICES
Filed Nov. 23, 1962     4 Sheets-Sheet 1
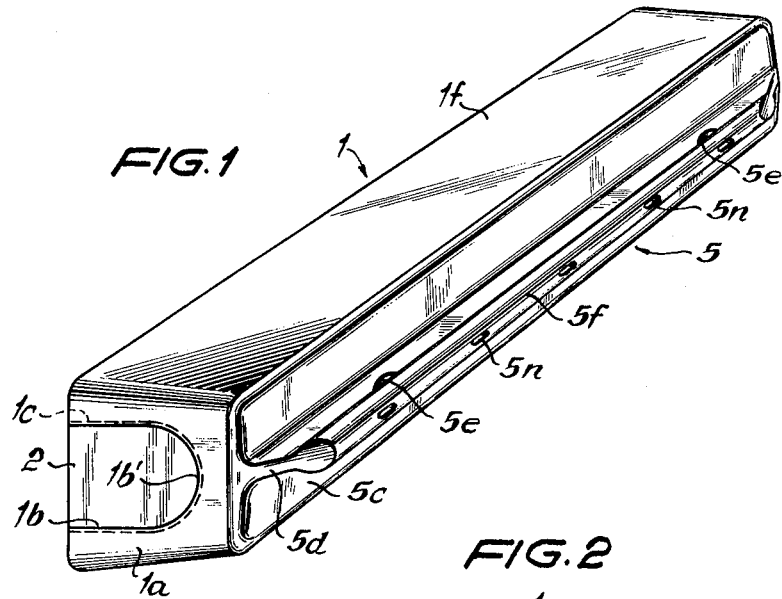
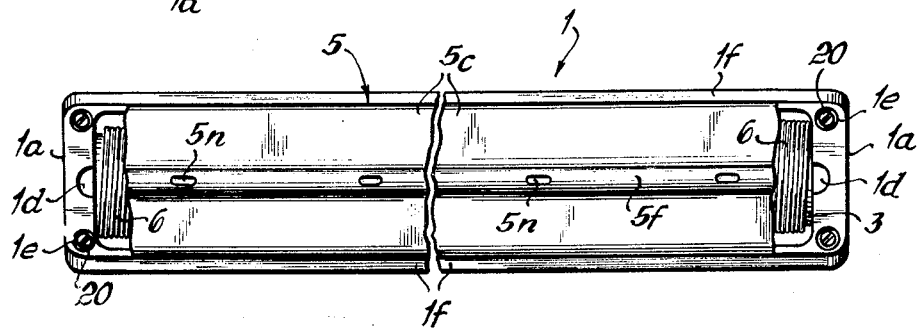
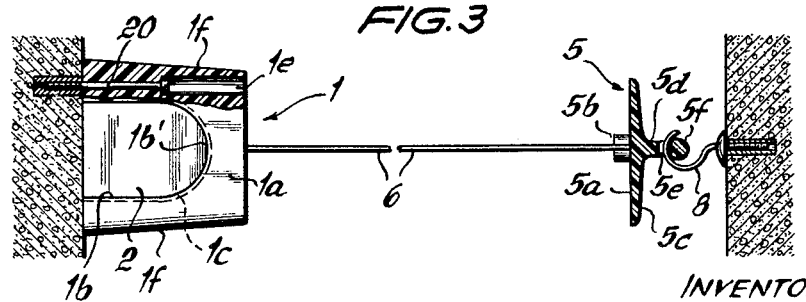
INVENTOR:

March 16, 1965  W. HESENER  3,173,548
RETRACTABLE CLOTHESLINES DEVICES
Filed Nov. 23, 1962  4 Sheets-Sheet 2

INVENTOR:
Walter Hesener
by Erwin Salpn
Atty.

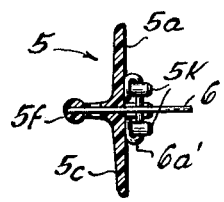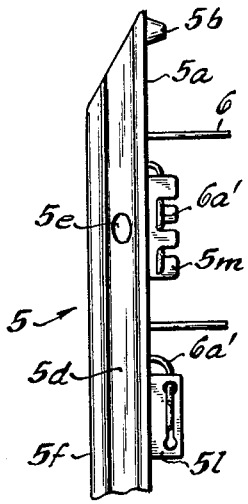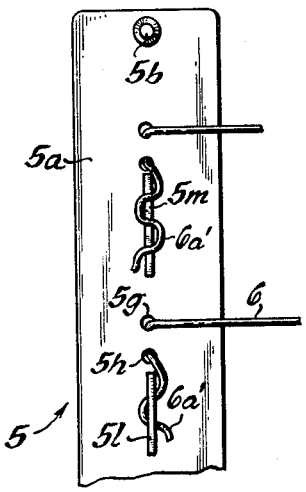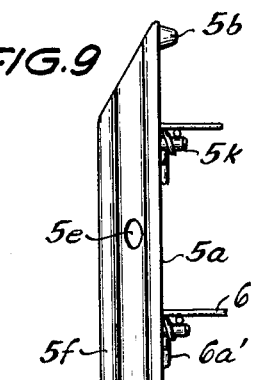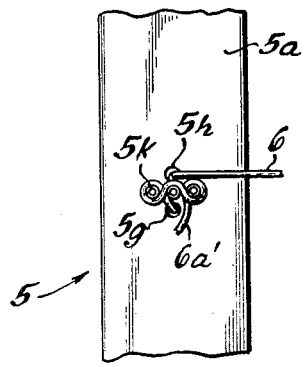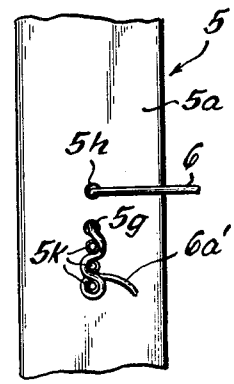

March 16, 1965 W. HESENER 3,173,548
RETRACTABLE CLOTHESLINES DEVICES
Filed Nov. 23, 1962 4 Sheets-Sheet 4

INVENTOR:
Walter Hesener
by [signature]
Atty.

United States Patent Office 3,173,548
Patented Mar. 16, 1965

3,173,548
RETRACTABLE CLOTHESLINES DEVICES
Walter Hesener, 33 Rue de Livron, Meyrin-Geneva, Switzerland
Filed Nov. 23, 1962, Ser. No. 239,536
Claims priority, application Switzerland, Nov. 24, 1961, 13,688/61
13 Claims. (Cl. 211—119.15)

The invention relates to retractable clotheslines devices.

This invention refers more particularly to devices comprising a spring biased tubular roller rotatably mounted in a housing and a plurality of clotheslines of which one end is wound upon the roller and the other end attached to a drawbar so that the clotheslines can be effectively lengthened as the drawbar is moved away from the roller. The housing, the drawbar and/or the roller are preferably made of plastics or die-cast aluminum. These parts are structural components ready for assembly, including holes for attachment of the housing to a wall, bearings for the roller and transverse stiffening ribs formed in or on the housing, means for attachment of the clotheslines formed in or on the drawbar, and holes formed in the roller for securing clotheslines to the latter.

Such an arrangement is simple and inexpensive, particularly when the device is made of plastics. Only the spring for operating the roller needs to be made of metal, while virtually all the other components may be molded parts.

It is one object of the invention to provide retractable clotheslines for indoor use which are simple, easy to manufacture and have considerable dimensional stability.

Another object of the invention is to provide a retractable clotheslines device including an improved bearing or supporting structure for the reel or roller for the clotheslines.

Further advantageous features of the device according to the invention and objects thereof will become apparent from the following description with reference to the accompanying drawings wherein:

FIG. 1 is a perspective view of a retractable clotheslines device embodying the invention wherein the drawbar is formed as a cover for the housing of the roller and is shown in the position wherein it abuts against the housing;

FIG. 2 is a front elevation of the device shown in FIG. 1;

FIG. 3 is partly a side elevation and partly a cross-section of the device of FIGS. 1 and 2 attached to two opposite walls and being in the operating position;

FIG. 9 is in part a side elevation and in part a longitudinal section of a drawbar in the form of a cover for the roller housing;

FIG. 10 is a cross-section through the structure of FIG. 9;

FIG. 11 is a fragmentary bottom plan of the cover of FIG. 9;

FIG. 12 is a bottom plan view similar to that of FIG. 11 of a portion of a modified drawbar;

FIGS. 13 and 14 are a fragmentary side elevation and a bottom plan view, respectively of a drawbar having integral webs with slots or holes therein for attaching the clotheslines;

Figure 4:
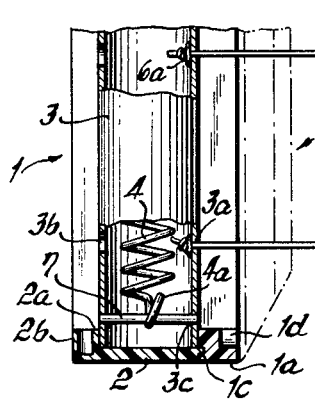
FIG. 4 is in part a longitudinal section and in part a top plan view of a portion of the device of FIGS. 1–3 showing the torsion spring for operating the roller and showing a slightly modified form of securing the clotheslines to the drawbar.

The device shown in FIGS. 1–5 comprises a housing member 1 having slide members 2 inserted into the ends 1a thereof, a tube 3 operating as a roller for the storage of clotheslines, a spring 4 biasing tube or roller 3, a drawbar 5 and the clotheslines 6 having one end wound on tube 3 and another end attached to the drawbar 5.

The frame-like housing member 1 is provided with all the holes, recesses, ribs, etc., required for the assembly of the device. Its reinforced ends 1a each have an arch-shaped recess 1b, open at the rear or bottom of member 1. The diameter of the semi-circular portion of recess 1b is the same as the external diameter of the tube or roller 3. Into each of the recesses 1b at the ends of housing a thin slide member 2 is inserted. Slide members 2 are secured to housing member 1 by a tongue-and-groove connection 1c. Slide members 2 are coextensive with recesses 1b. On the inside of the lower portion of each of the slide members 2 there is an arcuate raised portion 2a providing a bearing for the roller 3 (see FIG. 5). Bearing portion 2a has the same diameter as the semi-circular portion of recess 1b, and is arranged in coaxial relation to recess 1b. Below the raised portion 2a the slide members 2 have additional webs 2b, 2c imparting to them the thickness of the ends 1a of housing 1. Above the arch-shaped recesses 1b in each of the ends 1a of housing 1 there is a central hole 1d for centering or aligning and for gripping the drawbar 5. Two holes 1e in casing or housing 1 are intended to receive screws 20. Holes 1e extend laterally of the arch-like recess 1b and are diametrically offset (FIG. 3). Screws 20 are intended to secure the housing 1 to the wall of a room of a dwelling. The fact that the bearings for the roller 3 and the fastening holes 1e are located in the reinforced ends 1a of the housing 1 keeps the tensile forces resulting from the loaded clotheslines 6 from subjecting the long side walls 1f of the housing 1 to excessive tensile stresses.

Figure 16:
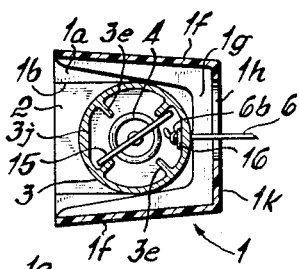
FIG. 16 is a cross-section through the device of FIG. 15.

One side of the roller 3 has a number of aligned holes 3a each for receiving a clothesline and each having approximately the same diameter as the line. The opposite side of roller 3 has a corresponding number of holes 3b, of larger diameter, aligned with the holes 3a. The end of each clothesline 6 to be fastened is pushed into the roller through one hole 3a of smaller diameter until it protrudes from the other side through the corresponding hole 3b of larger diameter. A double knot 6a is then made and the line 6 pulled back until the knot engages the inner surface of the roller. The torsion spring 4 arranged inside of the roller 3 is fastened to the latter by means of a pin 7 which is press-fitted into holes 3c in the roller 3 and is engaged by a loop 4a formed by the spring. At the other side of housing 1 (not shown) the second end of the spring 4 is suspended from a pin press-fitted into the end 1a of the housing 1 or into slide member 2, as shown in FIG. 16, to be described below more in detail. Since all the holes 3a–3c are formed in the roller 3 during the die-casting or injection molding process by which roller 3 is made, the production cost of roller 3 is relatively small.

The drawbar 5 is designed to form a cover for the housing 1. As the other components of the device, drawbar 5 is made of a plastic by injection molding or of a metal by die-casting with all the required fittings and holes formed therein. Its underside 5a has projections 5b which engage the recesses 1d in the ends 1a of housing 1 so as to hold the drawbar 5 in its proper position on the housing when the lines 6 are wound up. On the front side 5c of drawbar 5 a ridge 5d is formed integral with drawbar 5 and arranged in the horizontal plane of symmetry of bar 5. Ridge 5d is provided with holes 5e for insertion of wall hooks 8, as clearly shown in FIG. 3. The ridge 5d has an enlarged cross-section at its outwardly projecting end 5f where it is engaged by hooks 8. This imparts to part 5 the mechanical strength required of it when the lines 6 are loaded. Drawbar 5 has two parallel, closely adjacent holes 5g, 5h which extend through the ridge 5d and are interconnected by a groove 5n on the outside of the enlarged cross-section portion 5f. In order to attach line 6 to drawbar 5 one end of the line is pushed from the side 5a of the drawbar 5 through the hole 5h, then inserted into groove 5n and hole 5g and knotted onto the portion of the line entering hole 5h. This is clearly shown in FIG. 4.

Figure 6:
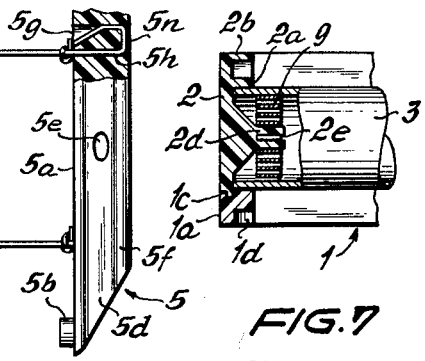
FIG. 6 is a fragmentary longitudinal section through the housing and refers to a modification of the structure of FIGS. 1–5 wherein a spiral spring is mounted in one end of the roller for operating the latter.
Figure 5:
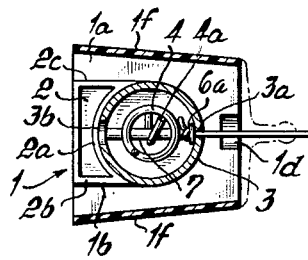
FIG. 5 is a fragmentary cross-section of the device of FIG. 4.

In the modification of the apparatus shown partly in longitudinal section in FIG. 6 a spiral spring 9 is provided instead of the helical torsion spring 4 shown in FIGS. 4 and 5. Spring 9 is mounted in one end of the roller 3 on a peg 2d integral with slide member 2. The inner end of spring 9 projects into the slot 2e in peg 2d and its outer end projects into a slot (not shown) provided in the roller 3. All the other structural features of the embodiment of the invention shown in FIG. 6 are the same as in the embodiment described above and shown in FIGS. 1–5. A spring arrangement identical to that shown in FIG. 6 may be provided at the opposite end (not shown) of the roller 3.

Figure 7:
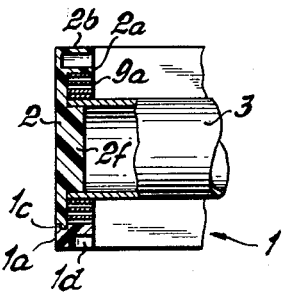
FIG. 7 is a view similar to that of FIG. 6 including a spiral spring drive arranged on one end of the roller for storing clotheslines.

FIG. 7 differs from FIG. 6 in that a spiral spring 9a biasing roller 3 is arranged externally on the end of the roller 3 rather than inside of roller 3. Roller 3 is journalled on a cylindrical projection 2f integral with the slide member 2 projecting into the interior of the roller 3. An identical spring arrangement may be provided at the opposite end of the roller 3 (not shown).

Figure 8:
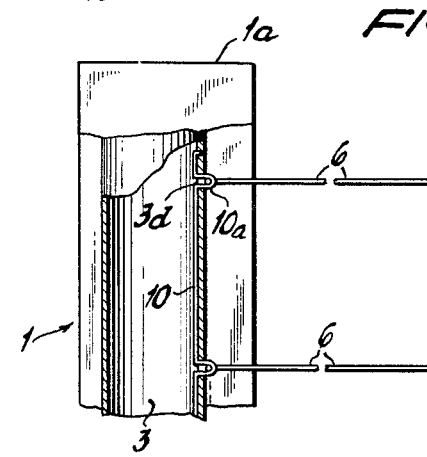
FIG. 8 is in part a fragmentary longitudinal section through a modified device wherein the clotheslines are attached to the roller and drawbar in a different fashion.

In the embodiment of the invention shown in FIG. 8 roller 3 is provided with holes 3d forming a row extending longitudinally of the roller 3. Holes 3d are provided for the purpose of fastening the lines 6 to roller 3. A metal bar 10 abutting against the inner wall of the roller 3 forms eyelets 10a projecting through the holes 3d to the outside of roller 3. In this embodiment of the invention the side 5a of the drawbar 5 has a longitudinal ridge or projection 5i which is approximately opposite the external ridge or projection 5d and is provided with passageways 5j, through which the lines 6 can be threaded. With this construction a long, continuous line 6 may be threaded through the holes 5j and eyelets 10a.

FIGS. 9 to 11 show an arrangement for securing the ends of the lines to the drawbar 5 without resorting to knots (as in FIG. 4). Three vertically aligned pegs 5k, slightly tapered at the top, are molded onto the inside 5a of the drawbar 5 between each pair of holes 5g, 5h. The three pegs are spaced in such a way that the lines 6 can be wound or looped around and clamped between them. The end 6a' of line 6 passing through hole 5g is wound around the pegs 5k.

As illustrated in FIG. 12, the pegs 5k can also be arranged in horizontal rows. The number, arrangement or construction of the line-clamping pegs may be modified as desired.

Instead of providing line-clamping pegs, according to FIG. 13 drawbar 5 is provided with webs 5l', 5m having holes or slots formed in them, by means of which the ends of the lines 6 can be adequately fastened by wrapping them around the webs.

Figure 17:
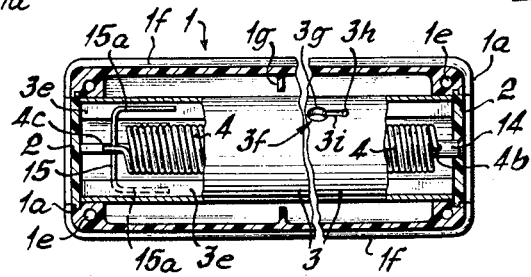
FIG. 17 is a fragmentary longitudinal section of the structure of FIGS. 15 and 16.
Figure 15:
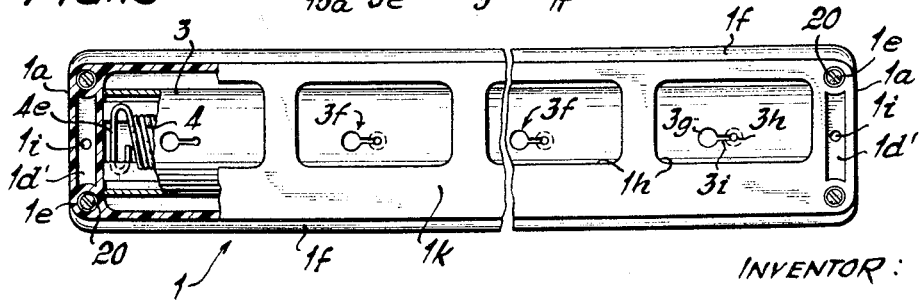
FIG. 15 is in part an elevation and in part a section of a retractable clotheslines device including a roller housing having ribs to increase the strength thereof.

The housing member 1 shown in FIGS. 15 to 17 is reinforced by a number of integral ribs 1g extending perpendicularly between the longitudinal side walls 1f. Ribs 1g are equally spaced from each other and from the ends 1a of housing 1. The ribs 1g define a U-shaped recess receiving the roller 3 (FIG. 16). The housing 1 is closed at the front by an integral rectangular plate 1k which is provided with apertures 1h for the passage of lines 6. The cross-ribs 1g and wall 1k impart to the housing 1 substantial rigidity so that it can withstand great stresses. A recess 1d' is formed in each of the ends 1a of housing 1 above the arch-shaped recesses 1b for receiving slide member 2. The bottoms of recesses 1d' are perforated at 1i to supply the bearing of roller 3 with a lubricant. To this end recess 1d' contains a wad impregnated with silicone grease.

Roller 3 is reinforced by four webs 3e integral with roller 3 and having equal angular spacings. As shown below webs 3e support the helical torsion spring 4 arranged coaxially with roller 3. Spring 4 is narrower than the internal diameter of the roller 3, and extends inwardly from one end of the roller 3 to the other with a slight taper. At one end 4a torsion spring 4 is suspended in a transverse hole extending through a metal peg 14 pressed into the slide member 2. The other end of the spring 4 (FIGS. 16 and 17) forms a small eyelet 4c through which a U-shaped wire yoke 15 is threaded. The two flanges 15a of yoke 15 abut against two opposite webs 3e. This establishes a simple, normally torsion-free sliding connection between the spring 4 and the roller 3. Thus spring 4 cannot exert any axial forces on the roller 3.

In the structure of FIG. 15 the U-shaped wire yoke 15 is dispensed with. The left end of the spring 4 forms an eyelet 4e which extends on both sides beyond the outer surface of the spring 4 and abuts against webs 3e. As shown in FIGS. 15–17 roller 3 has suitable keyhole-shaped holes 3f aligned in a direction longitudinally thereof. The diameter of the larger portion 3g of hole 3f is equal to that of a double knot in the line, and the diameter of the smaller portion 3h of hole 3f is equal to that of the line itself. Slot 3i connecting the two circular regions 3g, 3h is slightly narrower than the diameter of the line. The roller 3 is slightly reinforced internally in the region of the holes 3f. An identical reinforcement 3j (FIG. 16) is provided on the opposite roller 3 in order to prevent the latter from being distorted. In order to fasten a clothesline in a keyhole-shaped hole 3f a knot 6b is tied in it. The knot is pushed through the larger portion 3g of the hole 3f and pulled laterally to the right into the smaller portion 3h. It is advisable to mount a small disc or washer 16 between the knot 6b and the roller 3.

Figure 18:
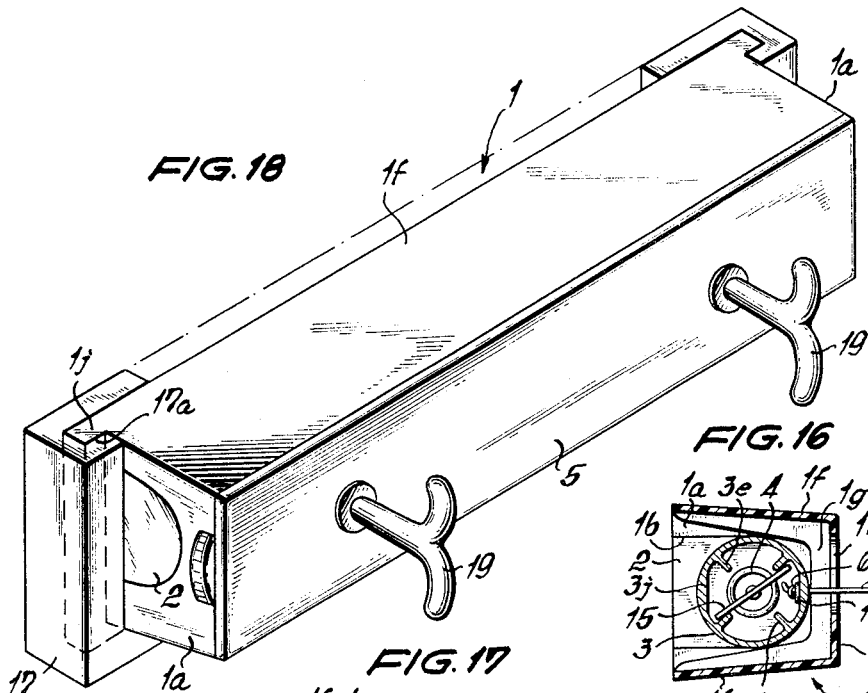
FIG. 18 is a perspective view of a complete retractable clotheslines device attached to a base plate of a plastic material or die-cast aluminum by means of a tongue-and-groove connection.

In the structure of FIG. 18 flanges 1j are integral with the ends 1a of the housing 1. Housing 1 is attached to the wall by means of a baseplate 17 which may be screwed to the wall. The two ends of the plate 17 have grooves 17a which are open on the sides facing each other and at the top, and which are engaged by the flanges 1j of the housing 1. This makes it possible to attach the clothesline device at different locations of an apartment. Double hooks 19 are mounted on the cover or draw bar 5 may be used for engaging wall hooks and for hanging garments thereon.

It may also be mentioned that the plastic slide members 2 which are inserted into the end apertures 1b by the tongue-and-groove connections 1c are preferably thermally spot-welded on the inside of housing 1 to prevent the device from being disassembled by non-experts.

I claim:
1. A retractable clotheslines device comprising in combination:
   (a) an elongated housing substantially U-shaped in cross-section having a perforated front for the passage of clotheslines and having reinforced ends, at least one of said ends defining an arch-shaped recess having a closed semi-cylindrical end adjacent said perforated front of said housing and being open at the opposite end thereof;
   (b) a spring-biased rotatable roller inside said housing supporting clotheslines projecting through said perforated front of said housing, said roller having one end engaging on one side thereof said semi-cylindrical end of said recess;
   (c) an elongated drawbar arranged in front of said perforated front of said housing, portions of said clotheslines being attached to said drawbar; and
   (d) an arch-shaped slide member inserted into said recess of said housing and closing said recess, said slide-member defining an arcuate bearing surface for said one end of said roller diametrically opposite to said semi-cylindrical end of said recess.

2. A retractable clotheslines device as specified in claim 1 including a tongue-and-groove connection securing said slide-member to said housing.

3. A retractable clotheslines device as specified in claim 1 wherein said reinforced ends of said housing define passageways extending at right angles to said perforated front thereof for receiving fastener means for securing said housing to a vertical wall.

4. A retractable clotheslines device as specified in claim 1 wherein said drawbar is substantially T-shaped in cross-section and includes a flange abutting against said perforated front of said housing and substantially coextensive with said perforated front and wherein said drawbar includes a web having an edge portion of slightly shorter length than said flange.

5. A retractable clotheslines device as specified in claim 1 wherein the inside of said housing is provided with transverse reinforcement ribs arranged at right angles to said perforated front thereof and defining substantially U-shaped recesses receiving said spring-biased roller.

6. A retractable clotheslines device as specified in claim 1 comprising:
   (a) radially extending reinforcement ribs inside of said roller leaving a clear passageway extending in a direction longitudinally of said roller;
   (b) a substantially helical torsion spring for biasing said roller arranged inside said passageway; and
   (c) a substantially U-shaped support for one end of said spring, said spring support having a pair of flange portions abutting against and slidable relative to said reinforcement ribs in a direction longitudinally of said roller and said spring support having a flange portion engaged by one end of said torsion spring.

7. A retractable clotheslines device as specified in claim 1 including cooperating recesses and projections on said perforated front of said housing and on the rear of said drawbar for effecting proper registration between said perforated front of said housing and said drawbar.

8. A retractable clotheslines device as specified in claim 1 wherein said spring-biased roller has aligned perforations for the insertion of ends of clotheslines, each of said perforations being relatively wide adjacent one end thereof and each of said perforations being relatively narrow adjacent the other end thereof.

9. A retractable clotheslines device as specified in claim 1 wherein said spring-biased roller has on one side thereof aligned perforations of a predetermined size for securing to said roller ends of clotheslines of which each is provided with a knot, and wherein said roller further has on the diametrically opposite side thereof aligned perforations of larger size than said predetermined size.

10. A retractable clotheslines device as specified in claim 1 comprising:
    (a) a separate frame structure for supporting said housing at the side opposite said perforated front thereof, said frame structure defining a pair of vertical grooves open at the top and closed at the bottom and having a spacing substantially equal to the length of said housing; and
    (b) a pair of ribs integral with said reinforced ends of said housing engaging said pair of vertical grooves.

11. A retractable clotheslines device comprising in combination:
    (a) an elongated housing substantially U-shaped in cross-section having a perforated front for the passage of clotheslines and having reinforced ends, registration means on said front, and at least one of said ends defining an arch-shaped recess having a closed semi-cylindrical end adjacent said perforated front of said housing and being open at the opposite end thereof;
    (b) a spring-biased rotatable roller inside said housing supporting clotheslines projecting through said perforated front of said housing, said roller having one end engaging on one side thereof said semi-cylindrical end of said recess and being laterally supported by said end of said recess;
    (c) an elongated drawbar substantially T-shaped in cross-section arranged in front of said front of said housing, said drawbar having a flange abutting against said front of said housing and said flange having registration means cooperating with said registration means on said front of said housing, portions of said clotheslines being attached to said drawbar and said drawbar comprising a web adapted for use as a handle for operating said drawbar to unwind said clotheslines from said roller; and
    (d) an arch-shaped slide member inserted into said recess of said housing for closing said recess, said slide member defining a bearing surface for one end of said roller providing lateral support for said one end of said roller, said bearing surface being arranged diametrically opposite to said semi-cylindrical end of said recess.

12. A retractable clotheslines device as specified in claim 11 wherein said web of said drawbar defines perforations extending substantially parallel to said flange thereof and adapted to be engaged by drawbar restraining elements projecting through said perforations transversely across said web of said drawbar.

13. A retractable clotheslines device as specified in claim 11 wherein said flange and said web of said drawbar define straight perforations extending at right angles to said flange and receiving portions of said clotheslines, and wherein the side of said flange of said drawbar is provided with means for imparting zig-zag shape to ends of clotheslines to clamp said ends of clotheslines to said flange of said drawbar.

References Cited by the Examiner

UNITED STATES PATENTS

| | | | |
|---|---|---|---|
| 2,481,638 | 9/49 | Borup | 211—119.15 |
| 2,547,777 | 4/51 | Ray | 211—119.15 X |
| 2,597,615 | 5/52 | Brown | 242—107 |
| 2,647,960 | 8/53 | Benjamin | 242—107 X |
| 2,747,813 | 5/56 | Priest | 242—107.1 |
| 2,865,514 | 12/58 | Goodman | 211—119.15 |
| 2,891,757 | 6/59 | Lang | 248—224 |
| 2,914,188 | 11/59 | Hansen | 211—119.15 |

CLAUDE A. LE ROY, *Primary Examiner.*

FRANK L. ABBOTT, *Examiner.*